Sept. 19, 1944.  F. W. SCHWINN  2,358,737
CUSHIONED HANDLEBAR
Filed Jan. 5, 1942  2 Sheets-Sheet 2
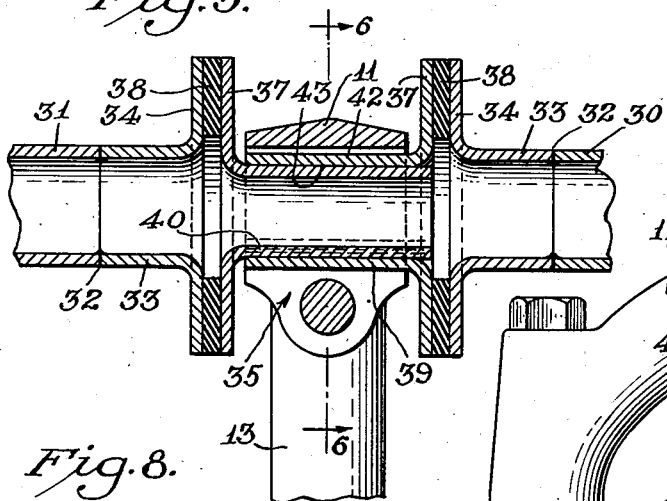
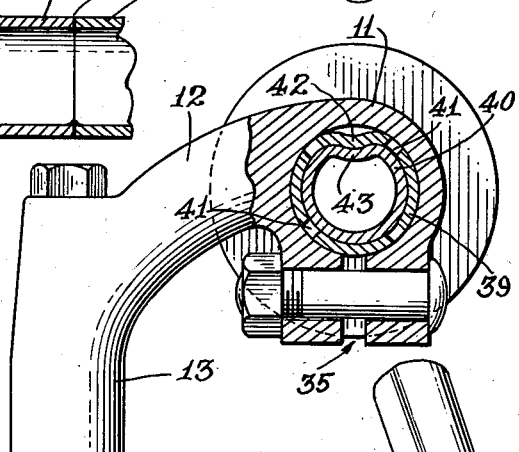
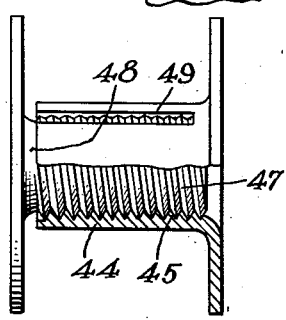
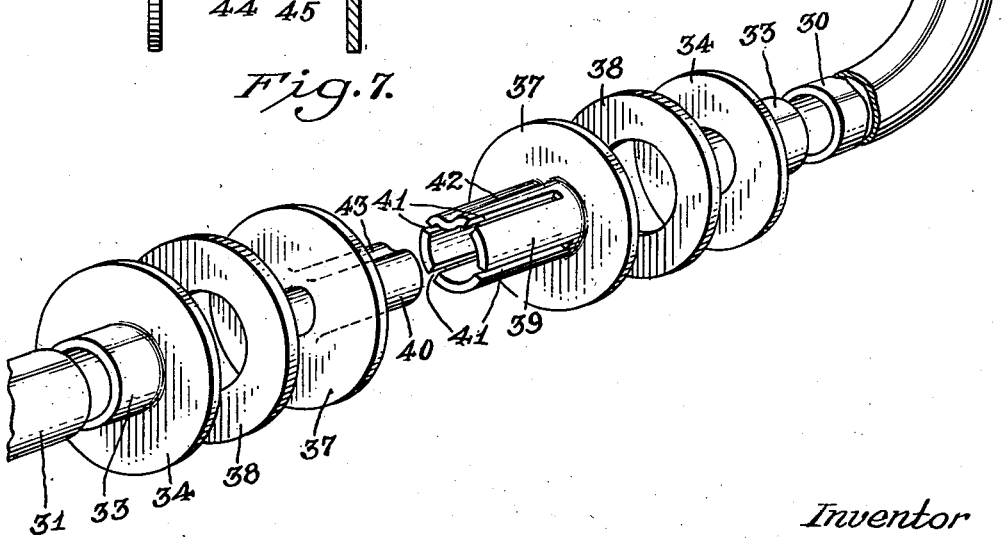
Inventor
Frank W. Schwinn
BY
McCaleb, Wenat & Dickinson
Attorneys.

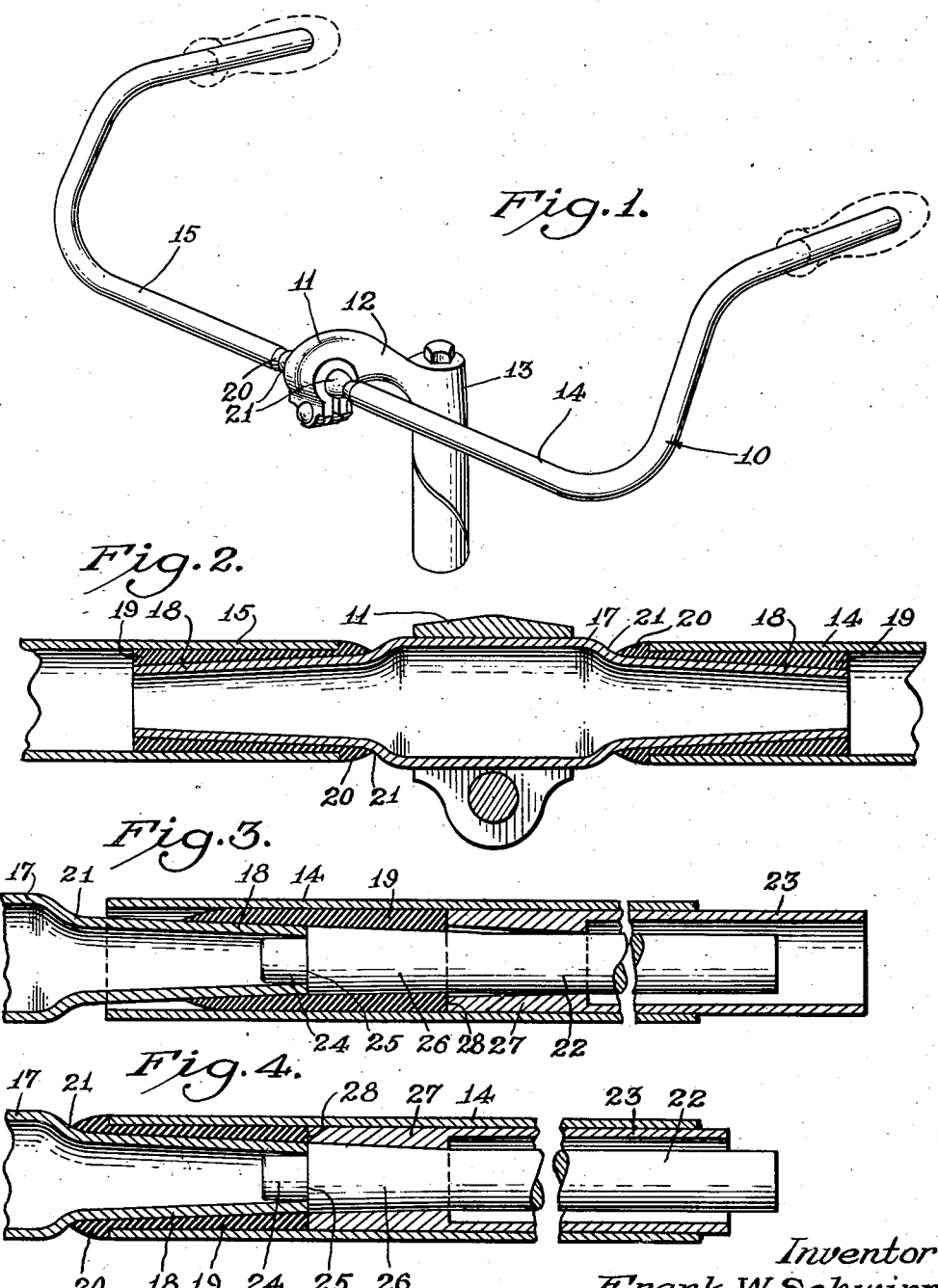

Patented Sept. 19, 1944

2,358,737

UNITED STATES PATENT OFFICE 2,358,737

CUSHIONED HANDLE BAR

Frank W. Schwinn, Chicago, Ill.

Application January 5, 1942, Serial No. 425,600

4 Claims. (Cl. 287—85)

This invention relates to bicycle or like handlebars and more particularly concerns a novel handlebar construction which is cushioned against road shocks and vibrations.

Heretofore it has been proposed to cushion bicycle handlebars completely by interposing a ring of rubber between the handlebar and the clamping eye of the bicycle steering post. Such expedient requires substantial clearance between the handlebar and the clamping eye in order to accommodate the layer of rubber. Moreover, the rubber must be protected against uneven compression or damage by the clamping eye, which has necessitated the provision of a metal ferrule or sleeve encasing the rubber sleeve. This requires additional clearance. As a result, some part associated with the cushion must be altered in size from conventional standards in order to afford the necessary clearance. Enlargement of the clamping eye of the steering post has been resorted to, but such deviation from accepted standards unreasonably increases cost and limits application of the cushioned handlebar. Moreover, the limited size of the rubber ring has been a serious handicap to cushioning efficiency.

Whereas in prior cushioned handlebars clearance for the thickness of the cushioning rubber was provided either by enlarging the clamping eye beyond standard or by ensmalling the central region of the handlebar at the clamping eye and thereby weakening it, in the cushioned handlebar of my present invention both the eye and the central handlebar region, or clamping seat, are left of standard size. Yet my handlebar does not appear—on casual view—to be conspicuously unlike the usual handlebar, and preserves the general appearance of a continuous tube to which cyclists are accustomed.

According to my present invention, a handlebar is provided which is adapted to be used as original or replacement equipment for reception in a conventional steering post eye clamp, and which is efficiently cushioned, independently of the eye clamp, against the transmission of shocks and vibrations from the clamp to the handle grip sections of the handlebar.

Another object of the invention is to cushion each side of the handlebar independently of the other, and to increase the total effective cushioning area as compared to prior cushions.

A further object of the invention is to provide a bicycle handlebar which is formed from a number of components which are premanently united by the same means which function as the shock and vibration absorbing cushions of the handlebar.

Still another object of the invention is to provide a handlebar that can, if desired, be assembled with the clamping eye of the steering post without threading the handlebar through the eye.

Another object is to provide a simple and inexpensive method of, and means for, making a cushioned handlebar.

Other objects and advantages of the invention will be apparent from the following description and the accompanying drawings, in which similar characters of reference indicate similar parts throughout the several views.

Referring to the drawings:

Fig. 1 is a perspective view of a handlebar embodying the features of my invention, assembled with a conventional steering post;

Fig. 2 is a fragmentary enlarged longitudinal sectional view through the center portion of the handlebar showing details of the cushion-connection between the handle grip sections and the clamp seat;

Fig. 3 is a fragmental longitudinal sectional view, showing a portion of the handlebar, and cooperating apparatus for placing the cushion-connection, the parts being at an intermediate stage in the assembly operation;

Fig. 4 is a longitudinal sectional view similar to Fig. 3, but showing the parts at the completion of the assembly operation;

Fig. 5 is a fragmentary longitudinal sectional view through the mid-portion of a modified form of the handlebar;

Fig. 6 is a vertical sectional view taken substantially along the line 6—6 of Fig. 5;

Fig. 7 is an exploded assembly view of the modified form of the invention of Fig. 5; and Fig. 8 is a fragmentary side elevational view, partially broken away to expose certain details, of a slight variant of the modified form of Fig. 5.

A handlebar 10 (Fig. 1) embodying the features of my invention may be of the style which is adapted to be threaded into place endwise through a conventional clamping eye 11 formed at the end of a gooseneck extension 12 of a bicycle steering post 13.

In accordance with the present invention, the handlebar 10 is preferably made from a plurality of sections which are permanently connected together by means that function also as the shock and vibration absorbing media for the handlebar. To this end, the handlebar comprises a left arm or handle grip section 14 and a separately formed right arm or handle grip section 15, both preferably formed from cylindrical tubular stock. The adjacent ends of the handle grip sections are maintained in coaxial, longitudinally spaced relation by a tubular clamping eye seat member 17. The central portion of the seat member 17 is cylindrical and of sufficient length and proper diameter for effective engagement by the eye clamp 11 to hold the handlebar in any preferred adjusted position.

At its opposite ends the seat member 17 is formed with identical coaxial terminals or arms 18 which are of substantial length and of substantially smaller outside diameter at their base than the inside diameter of the handle grip sections 14 and 15. Each of the arms 18 is further of uniformly diminishing diameter toward its end, resulting in a substantially frusto-conical shape.

Throughout their major extent, the arms 18 are telescoped into the respective tubular end portions of the handle grip sections 14 and 15, with the opposing surfaces of the arms and the handle grip sections entirely spaced concentrically. A substantial spacing is also maintained between the extremities of the sections 14 and 15 and the adjacent ends of the cylindrical body of the seat member 17. The spaced relation of the parts is maintained by shock and vibration absorbing cushions 19 formed from resilient material such as rubber. The cushions 19 are bonded to all engaged surfaces and thus secure the handle grip sections 14 and 15 permanently to the respective arms 18. The material for the connecting cushions 19 should be selected for ample density and tensile strength so that the cushions will adequately resist yieldably forces encountered in use which would tend to separate the parts by pulling or twisting action and which will be of proper resiliency for efficient cushioning.

In assembly the seat member 17 will be held rigidly by the eye clamp 11. However, each of the handle grip sections 14 and 15 may move independently of the seat member 17 and of each other in all directions relative to the connecting arms 18 to the extent permitted by the respective cushions. Thus, the handle grip sections may rock about the axis of the arms 18, or about any diametrical axis through the respective arms. A certain, though possibly more limited amount of movement in an axial direction is also permitted. Hence, the handlebar sections have practically universal movement relative to the connecting arms 18 and are cushioned against shocks and vibrations which might otherwise be transmitted from the latter in the use of the bicycle. The resiliency of the cushions 19 causes them to act as springs, combining the attributes of both torsion spring and compression springs, to return the associated handlebar sections to normal position relative to the seat member 17.

It may be noted that by reason of the inwardly tapered structure of the connecting arms 18, the cushions 19 are thickest at their inner ends for more effectively withstanding compressive and tensioning forces resulting from rocking of the associated handlebar sections 14 and 15 about diametric axes.

As a precaution against possible contact of the extremities of the handlebar sections 14 and 15 with the cylindrical clamp seat portion of the member 17 or the encircled larger diameter base portions of the connecting arms 18, cushioning beads 20 are formed integral with the cushions 19 within the space between the handlebar section extremities and the ends of the clamp seat portion, formed as sloping shoulders 21 which merge into the connecting arms 18.

A convenient method of assembling the handlebar sections 14 and 15 with the seat member 17 comprises holding the parts fixedly aligned in the relative positions desired in the finished handlebar, forcing the rubber for the cushions 19 in doughy condition into the concentric spaces between the connecting arms 18 and the respective surrounding end portions of the handlebar sections, and then curing the rubber. This method is carried out while the handlebar sections 14 and 15 are still in straight tubular condition and before they are bent into the desired characteristic handlebar shape.

Simple apparatus for carrying out the method comprises a pilot bar or rod 22 and a tubular ram 23 (Figs. 3 and 4). One end of the pilot rod 22 has a reduced diameter centering pin 24 which is dimensioned to fit slidably into the socket provided by the tubular end of a selected one of the connecting arms 18. A shoulder 25 on the bar fits snugly against the extremity of the arm. From the shoulder 25, the pilot bar 22 tapers in continuation of the conical plane of the engaged arm 18 to provide a head 26 extending for a limited distance to merge with the main stem of the rod, which is of considerably smaller diameter than the encircling handlebar tube.

The ram 23 has a tubular head 27 which is internally proportioned to receive the pilot head 26 snugly and has a blunt ram nose 28 which extends flush with the shoulder 25 when the heads are in snug interengagement. The diameter of the ram 23 is such that it has close sliding fit with the inner wall of the handlebar tube.

Operation of the ramming apparatus is substantially as follows: After the handlebar tube (the section 14 has been selected for illustration in Figs. 3 and 4) and the seat member 17 have been placed in a suitable jig (not shown) with the connecting arms 18 in proper telescoped position within the end portion of the handlebar tube, the pilot rod 22 is placed in position with the head 26 closing the opening through the end of the connecting arm. Then a charge of doughy rubber, which is either carried by the rod 22 or is inserted into the space between the rod and the interior of the handlebar tube, is driven down the handlebar tube by the ram 23, as shown in Fig. 3. The ramming action is continued until the rubber mass is forced into complete occupation of the annular cushion space between the connecting arm 18 and the handlebar tube. Because of the tapered formation of the connecting arm 18, and therefore the gradually diminishing area of the cushion space into which the rubber is forced, a substantial and increasing back pressure is created as the ramming progresses, which assures thorough compacting of the rubber and proper density for the purpose intended.

When the ram 23 has been driven home, as shown in Fig. 4, the excess of rubber will exude from the end of the handlebar tube to form the cushioning bead 20, and the uniformity of extrusion of the bead will be an indication of the uniformity of the main body of the cushion inside the tube. The pilot rod and the ram are then removed and the process repeated with the opposite section of the handlebar (unless the apparatus is set up to assemble both of the handlebar sections 14 and 15 at the same time), and after completion, the assembly is removed to the curing oven for curing of the rubber cushions.

In the modified form of the invention shown in Figs. 5, 6 and 7, similarly as in the previously described form, the handle grip sections of the handlebar are cushioned against shock and vibration independently of each other and are secured to the associated eye clamp seat means by the cushioning means. The modified handlebar comprises identically constructed but complementary left and right handlebar sections or arms 30 and 31, respectively, each of which is secured at its inner extremity as by butt welding 32 to the end of a short tubular stem 33 formed concentrically integral with an axially facing, radially extending flange 34 of substantial area. The flanges 34 may be two and a half to three times as great in diameter as the handlebar tube, for which ⅞ inch tubing may be used.

A concentric spaced relationship of the flanges 34 is determined by a clamp seat structure 35 which includes flat, axially facing annular flanges 37 complementary to and opposing the flanges 34. The opposing pairs of flanges 34, 37 are secured in spaced, face-to-face relation by means of identical resilient cushions 38 which are preferably disk rings of rubber intimately bonded directly to the engaged faces of the flanges.

The density and tensile strength of the material of the connecting cushions 38 is such that the flanges 34 may rock to a limited extent rotatively relative to the associated flanges 37 as well as about any diametrical axis. The resiliency of the rubber cushions causes them to act as torsion springs to return the flanges to normal when relieved of the forces which have caused the rocking movement thereof. Moreover, due to the complete separation of the opposing flanges 34 and 37 and their entire dependence upon the interposed resilient cushions 38 for union, limited relative axial movement of the flanges is permitted by compression or stretching of the cushions. As a result of this complete cushioned separation of the flanges and the limited substantially universal movement permitted to the flanges 34 relative to the companion flange 37, shocks or vibrations which might otherwise be transmitted from the clamp seat 35 to the handlebar arms 30 and 31 are effectually dampened.

In order to facilitate optional assembly of the handlebar with the eye clamp 11 in a manner which will avoid the conventional threading of the handlebar through the clamping eye in either assembly or disassembly operations, the clamp seat 35 is formed of axially separable telescoping members. To this end, one of the flanges 37 is formed with an axial, tubular shank 39 which is preferably of substantially the same external diameter as a conventional clamp seat ferrule so as to be snugly embraced by the eye clamp 11 when the latter is tightened. The other flange 37 is formed with an axial tubular shank 40 of approximately the same external diameter as the internal diameter of the shank 39 into which the shank 40 is adapted to fit in slidable telescopic relation.

Thorough gripping of the shank 40 against longitudinal separation from the shank 39 is assured by providing the shank 39 with a plurality of longitudinal slots 41 which separate it into a plurality of relatively yieldable segments that are driven tightly against the periphery of the shank 40 by the pressure exerted by the eye clamp 11. Relative rotary movement of the shanks 39 and 40 is prevented by means such as a longitudinal inwardly extending bead 42 formed in one of the segments of the shank 39 which fits slidably into a complementary longitudinal groove 43 formed in the shank 40. The bead and groove arrangement also assures proper relative adjustment of the handlebar sections 30 and 31 during assembly.

Instead of a longitudinally slidable interfitting relationship of the clamp seat shanks, a threaded connection may be provided as shown in Fig. 8. Thus, the outer shank, identified by the numeral 44, may be formed with internal threads 45 to engage external threads 47 formed on the inner shank, identified by the numeral 48. Longitudinal slots 49 in the outer shank 44 assure through gripping of the inner shank 48 to hold the same against relative rotary movement after the clamping eye has been tightened against the seat.

It will be apparent that the novel handlebar construction of my present invention is more effectively protected against shocks and vibration because each handle grip section is separately insulated by a generously proportioned absorbing cushion. A special advantage of the relatively large engagement areas of the cushions resides in the practicability of thereby securing the handle grip sections to the clamp seat structure solely by the cushions, thus avoiding the use of any interconnecting structure of a type through which vibration might be transmitted from the steering post through the clamp seat to the handle grip sections. It may also be noted that these improvements and refinements have been incorporated in the handlebar in such a manner as to enable use of the handlebar with a conventional standard size of steering post clamp, thus rendering the handlebar available for practically unlimited use.

In the one form of the invention, moreover, conventional threading of the handlebar through the clamping eye of the steering post is dispensed with in favor of an improved manner of assembly.

While the invention is susceptible of various modifications, and alternative constructions, I have shown in the drawings and have herein described in detail certain preferred embodiments, but it is to be understood that I do not thereby intend to limit the invention to the specific forms disclosed, but intend to cover all modifications and alternative constructions falling within the spirit and scope of the invention as expressed in the following claims.

I claim:

1. In a cushioned connection between the cylindrical clamp seat member of a handlebar and separately formed handlebar arm sections having cylindrically tubular ends lying immediately adjacent to the ends of the clamp seat member: reduced diameter prolongations formed integral with the ends of said clamp seat member, said prolongations being received, in concentrically spaced relation, within the cylindrically tubular ends of the arm sections, and a sleeve of resilient cushioning material filling the space between each said prolongation and its associated tubular arm section, each said prolongation tapering away from the clamp seat member so that each sleeve end lying away from the clamp seat member is of substantially greater wall thickness than the sleeve ends lying adjacent to the clamp seat member.

2. A cushioning connection, as recited in claim 1, wherein the sleeves of resilient cushioning material are bonded to the handlebar arm sections and the prolongations of the clamp seat member, and have integral beads lying between the clamp seat member and the adjacent ends of the handlebar arm sections.

3. A cushioned connection of the class described, comprising a pair of juxtaposed elements, a first one of said elements having a tubular end portion lying adjacent to the second element, a prolongation of the second element which is received, in concentrically spaced relation, within the aforesaid tubular end portion, and a sleeve of resilient cushioning material filling the space between said tubular end portion and said prolongation, said prolongation tapering away from the element by which it is carried so that the sleeve end lying away from said second element is of substantially greater wall thickness than the sleeve end lying adjacent to said second element.

4. A cushioning connection, as recited in claim 3, wherein the sleeve of resilient cushioning material is bonded to said tubular end portion and said prolongation and has an integral bead lying outwardly of the tubular end portion and between said tubular end portion and the second element.

FRANK W. SCHWINN.